(12) United States Patent
Bruhn et al.

(10) Patent No.: US 9,917,673 B2
(45) Date of Patent: Mar. 13, 2018

(54) RATE CONTROL IN CIRCUIT SWITCHED SYSTEMS

(71) Applicant: Telefonaktiebolaget LM Ericsson (publ), Stockholm (SE)

(72) Inventors: Stefan Bruhn, Sollentuna (SE); Maria Hultström, Stockholm (SE); Karl Hellwig, Wonfurt (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 136 days.

(21) Appl. No.: 15/037,264

(22) PCT Filed: Mar. 10, 2016

(86) PCT No.: PCT/SE2016/050192
§ 371 (c)(1),
(2) Date: May 17, 2016

(87) PCT Pub. No.: WO2016/144246
PCT Pub. Date: Sep. 15, 2016

(65) Prior Publication Data
US 2017/0117985 A1    Apr. 27, 2017

Related U.S. Application Data

(60) Provisional application No. 62/132,081, filed on Mar. 12, 2015.

(51) Int. Cl.
*H04L 1/00* (2006.01)
*H04W 76/02* (2009.01)
*H04W 36/00* (2009.01)

(52) U.S. Cl.
CPC ....... *H04L 1/0002* (2013.01); *H04W 36/0083* (2013.01); *H04W 76/02* (2013.01)

(58) Field of Classification Search
CPC .. H04L 1/0002; H04W 76/02; H04W 36/0083
See application file for complete search history.

(56) References Cited

U.S. PATENT DOCUMENTS 6,611,867 B1 * 8/2003 Bowman-Amuah . H04L 41/046
709/218
2008/0140392 A1   6/2008 Kim
(Continued)

FOREIGN PATENT DOCUMENTS

WO    WO 2006/135334 A2    12/2006
WO    WO 2009/088848 A1    7/2009

OTHER PUBLICATIONS

International Search Report and Written Opinion of the International Searching Authority, Application No. PCT/SE2016/050192, dated Jun. 22, 2016.

*Primary Examiner* — Khaled Kassim
*Assistant Examiner* — Syed S Ali
(74) *Attorney, Agent, or Firm* — Sage Patent Group

(57) ABSTRACT

In accordance with an example embodiment of the present invention, disclosed is a method and an apparatus thereof for handling codec rate adaptation in a communication network applying circuit switched communication. The method is performed by a wireless device. The method comprises receiving an indication of a codec mode and determining a codec mode subset based on the indicated codec mode. Rate adaptation is applied based on the codec modes comprised in the determined codec mode subset having a bit rate below or equal to a bit rate associated with the indicated codec mode.

14 Claims, 9 Drawing Sheets

(56) References Cited

U.S. PATENT DOCUMENTS

| | | | | |
|---|---|---|---|---|
| 2008/0200154 | A1* | 8/2008 | Maharajh | G06F 17/30035 455/414.3 |
| 2009/0237255 | A1* | 9/2009 | Rofougaran | H04L 12/40013 340/572.7 |
| 2011/0202641 | A1* | 8/2011 | Kahn | H04W 36/0044 709/221 |
| 2011/0225417 | A1* | 9/2011 | Maharajh | G06F 21/10 713/150 |
| 2013/0166580 | A1* | 6/2013 | Maharajh | H04L 65/605 707/758 |
| 2014/0355443 | A1* | 12/2014 | Smith | H04W 28/0289 370/235 |
| 2015/0249940 | A1* | 9/2015 | Yang | H04W 36/04 455/436 |
| 2015/0341941 | A1* | 11/2015 | Nguyen | H04W 72/082 370/332 |

* cited by examiner

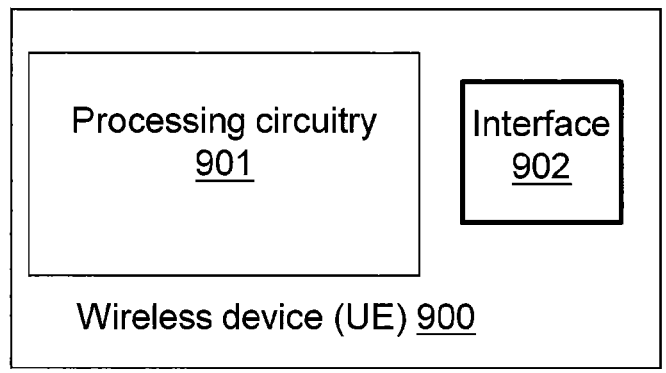
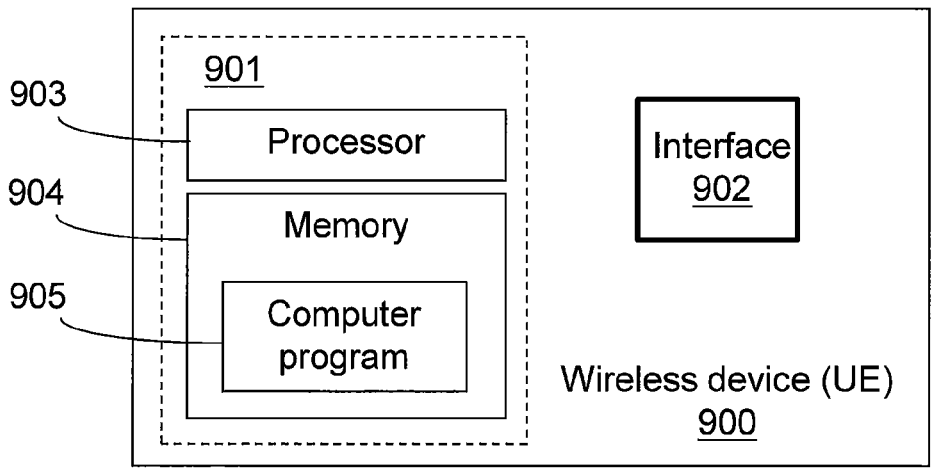
Figure 9a
Figure 9b
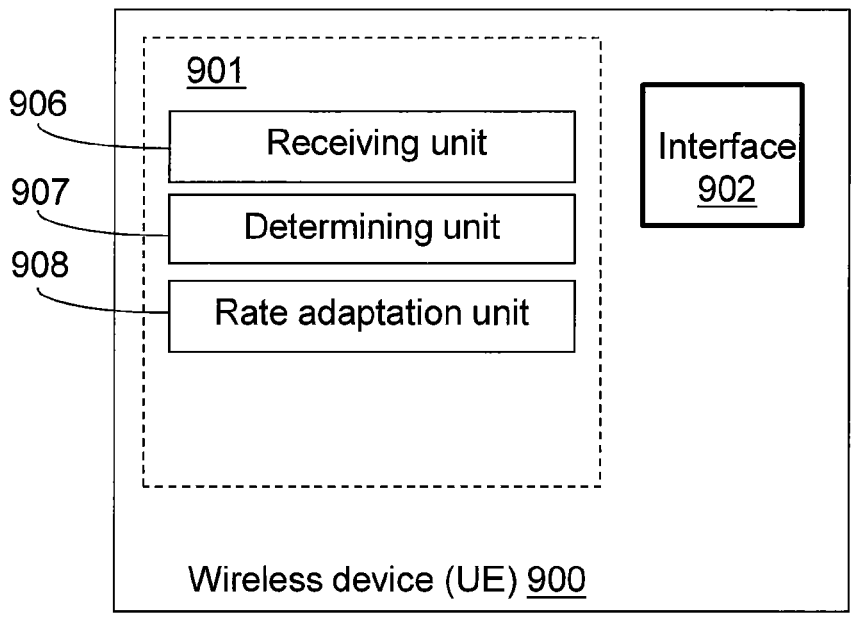
Figure 9c

RATE CONTROL IN CIRCUIT SWITCHED SYSTEMS

CROSS REFERENCE TO RELATED APPLICATIONS

This application is a 35 U.S.C. § 371 national stage application of PCT International Application No. PCT/SE2016/050192, filed on Mar. 10, 2016, which itself claims the benefit of U.S. provisional Application No. 62/132081, filed Mar. 12, 2015, the disclosure and content both of which are incorporated by reference herein in their entireties.

TECHNICAL FIELD

The embodiments of the solution disclosed herein generally relate to rate adaptation, and in particular to rate adaptation involving different alternative codec mode types in circuit switched systems.

BACKGROUND

The Enhanced Voice Services (EVS) codec is a multi-mode/multi-rate codec originally designed to offer enhanced voice services over LTE (Long Term Evolution), specifically in IMS (IP Multimedia Subsystem) with packet-based access.

The EVS codec provides a range of bit rates from average 5.9 kbps (source-controlled variable bit rate) over 7.2 kbps (constant bit rate) up to 128 kbps (constant bit rate). The purpose of provisioning this multitude of rates is to allow voice service operation tailored to specific system and service needs that may vary. For instance, a system may have strict capacity limitations in which case a low rate would be used. If there is no such capacity constraint a higher bit rate could be used. From a service quality perspective, higher bit rate operation is desirable as it can lead to better service (speech) quality. The EVS codec also offers a multitude of audio-bandwidth operation modes, i.e. an input signal can be encoded with a number of different bandwidths. This is a major enhancement as compared to Adaptive Multi-Rate (AMR) and Adaptive Multi-Rate Wideband (AMR-WB), which code one specific audio bandwidth only, narrowband or, respectively, wideband.

In practice the requirements on the bit rate to be used may vary during the speech session, such as a voice call. The reasons for such variations may be that available network capacity may change or that due to mobility a user equipment (UE) may roam to a cell with different transmission conditions, capacity or access technology. Rate control and codec re-negotiation is then used in order to adapt the used bit rate to the new needs. Codec re-negotiation is highly undesirable since it unavoidably interrupts the speech path.

The EVS codec comprises two basic types of operation modes, the EVS primary modes and the EVS AMR-WB interoperability (IO) modes (short 'EVS IO'). The latter are fully bit-stream interoperable with the 3GPP (3rd Generation Partnership Project) AMR-WB codec. They were included into the EVS Codec in order to provide transcoding-free interoperability of the EVS codec to UEs that support only AMR-WB, but not EVS, or to UEs that have roamed to cells that do not support EVS, but AMR-WB. In this way Codec Re-negotiation can be avoided and Rate Control can be used instead.

The EVS primary modes have a quality advantage but can only be used when the UEs and all involved communication system components support the EVS codec.

Important to note is also that the EVS codec is able to operate with different audio bandwidth, ranging from the traditional Narrowband (NB: 300 Hz . . . 34000 Hz) to Wideband (WB: 100 Hz to 7000 Hz) to Super-Wideband (SWB: 50 Hz . . . 15000 Hz) and even Fullband (FB: 20 Hz to 20000 Hz). Many modes operating at different bandwidths share the same bit rate, see table 1.

Table 1 lists all the available EVS codec modes and their respective bit rates, net payload sizes (in bits per 20 ms frame) and bandwidths. EVS uses in all modes a speech frame size of 20 ms.

As can be seen from table 1, the bit rate ranges of the EVS primary modes and the EVS IO modes are intertwined and the bit rates of either types of modes are not contiguous. It is also to be noted that the bit rates 2.0 and 2.4 kbps are related to Voice Activity Detection (VAD) and Discontinuous Transmission (DTX) in speech pauses, i.e. speech inactivity, and are used for the transmission of SID (Silence Insertion Descriptor) frames.

The EVS Primary mode 5.9 VBR (variable bit rate) uses frames respectively encoded at 2.8, 7.2 and 8 kbps instantaneous rate in a source controlled fashion, depending on the audio input signal. The long-term average bit rate of this mode for active speech is 5.9 kbps.

TABLE 1

EVS codec modes and their respective bit rates and net bit payload sizes per 20 ms frame

| Mode of Operation | Payload Size (bits) | Bitrate (kbps) |
| --- | --- | --- |
| EVS-IO | 40 | ~2.00 (EVS-IO SID), every 160 ms |
| EVS Primary | 48 | ~2.40 (EVS Primary SID), typically every 160 ms |
| EVS Primary | 56 | 2.80 constituent rate of 5.9 VBR mode (NB, WB, SWB) |
| EVS-IO | 136 | 6.60 (WB) |
| EVS Primary | 144 | 7.20 (NB, WB, SWB) also used as constituent rate of 5.9 VBR mode |
| EVS Primary | 160 | 8.00 (NB, WB, SWB) also used as constituent rate of 5.9 VBR mode |
| EVS-IO | 184 | 8.85 (WB) |
| EVS Primary | 192 | 9.60 (NB, WB, SWB) |
| EVS-IO | 256 | 12.65 (WB) |
| EVS Primary | 264 | 13.20 (NB, WB, SWB) |
| EVS-IO | 288 | 14.25 (WB) |
| EVS-IO | 320 | 15.85 (WB) |
| EVS Primary | 328 | 16.40 (NB, WB, SWB, FB) |
| EVS-IO | 368 | 18.25 (WB) |
| EVS-IO | 400 | 19.85 (WB) |
| EVS-IO | 464 | 23.05 (WB) |
| EVS-IO | 480 | 23.85 (WB) |
| EVS Primary | 488 | 24.40 (NB, WB, SWB, FB) |
| EVS Primary | 640 | 32.00 (WB, SWB, FB) |
| EVS Primary | 960 | 48.00 (WB, SWB, FB) |
| EVS Primary | 1280 | 64.00 (WB, SWB, FB) |
| EVS Primary | 1920 | 96.00 (SWB, FB) |
| EVS Primary | 2560 | 128.00 (SWB, FB) |

While the EVS codec has originally been standardized for voice service over PS (packet switched) based channels, like in LTE (Voice over LTE, VoLTE), efforts are currently ongoing to standardize it also for 3G CS (circuit switched) systems, such as 3GPP UTRAN (Universal Terrestrial Radio Access Network). FIG. 1 shows a schematic overview of a UTRAN 100 and an associated core network (CN) 101.

As can be seen from the working principles of rate control for AMR and AMR-WB codecs, rate control signaling in 3G CS systems differ with the access technology (GERAN and UTRAN) and is also different to the rate control signaling in PS systems.

In PS based systems, the transport of speech frames is using Real-time Transport Protocol (RTP) packets. Codec Mode Request (CMR) in RTP is one means to signal Rate Control commands in the User Plane (UP). Alternatively RTCP-APP may be used to carry CMR, also in the User Plane. RTCP-APP is based on the RTP Control Protocol (RTCP) which is a sister protocol of the RTP transmissions of real-time data like speech in PS based systems.

In GERAN (GSM-EDGE Radio Access Network), CMR is transported in every speech frame, on the User Plane, from the Mobile Station to the network and vice versa. On AoIP, the modern variant of the A-interface between GERAN and CS-Core, CMRs are (ideally) transported in every RTP packet, in uplink and in downlink.

In 3G-access, i.e. UTRAN, CMR is not transported together with the speech payload. Instead the radio network controller (RNC) 107 has specific means to control the uplink rate of the UE 103: the RNC may via RRC (Radio Resource Control) signaling on the control plane prevent the UE 103 from sending certain Transport Format Combinations (TFCs), thus allowing or forbidding certain modes of the configured mode set.

During call setup, at RAB (radio access bearer) Assignment the RNC 107 initializes RAB subflow combinations for all codec modes to be used on the Iu interface, and in addition a limitation of the maximum rate for the downlink (DL) can be given. Similarly, over the radio interface a radio bearer configuration is setup which may include TFCs corresponding to all the given codec rates or only for a select subset of the requested rates. In addition the UE 103 can be ordered to not use certain defined TFCs in the uplink (UL) at the initial setup or later during the call, temporarily or for the whole call.

Similarly, during the call, the RNC 107 may send Rate Control Request (RC-Req) Messages to the CS-Core (using Iu UP protocol messages), disabling certain modes in downlink.

For instance, if the RNC 107 has received a RAB Assignment Request from the CS-Core to set up a radio bearer for AMR with mode set 4.75, 5.9, 7.4 and 12.2, then the RNC 107 may generate a corresponding initialization message to the UE 103 and the media gateway (MGW), initializing all RAB Format combinations (RFCs) and TFCs for all these rates.

The RNC 107 may select an optimal radio configuration considering possible radio or transport limitations, and forbid higher codec rates in order to admit a speech user into the system or generally to provide service for a higher amount of speech users. As an example, the RNC 107 selects not to allow the highest rate 12.2 for operation. In that case, the Iu UP message makes sure that a lower rate, e.g. 5.9 rather than 12.2, is selected as an initial rate.

At RAB Assignment the RNC 107 must accept all modes (in IuUP Version 2) as commanded by the CS-Core. Later, during the call (in fact even immediately after RAB assignment) the RNC 107 may disable certain modes with high bit rates, e.g. due to cell capacity limitations.

For the radio interface the RNC 107 will define a radio bearer configuration that either includes TFCs for all requested codec rates including SID, or a radio bearer that only includes TFCs for a proper lower subset of the requested codec rates including SID in order to optimize the resource consumption. In addition to the defined TFCs over the radio interface, the RNC 107 may also choose to disallow the use of certain TFCs to be used by the UE 103 in UL. As a result this steers the maximum allowed codec rate. As an example, the UE 103 may be initialized with a radio bearer configuration with TFCs for AMR modes 4.75, 5.9, 7.4, 12.2. Additionally AMR-SID is needed for DTX operation. If the highest rate 12.2 shall not be used, an information element (IE) is included indicating that higher rates than the allowed maximum rate 7.4 are disallowed. This disallowance means that rates above the maximum rate 7.4 are forbidden for use and hence rate 12.2 will not be used, at least until signaled otherwise. If, for instance, the RNC 107 detects a condition under which it chooses to modify the decision to allow rate 7.4 as maximum rate, either that it would allow to use rate 12.2 as maximum rate or that it would reduce the maximum rate further to e.g. 5.90 kbps, then it may send a TFCC (Transport Format Combination control) message to the UE 103, modifying the allowed maximum rate in uplink.

An important aspect is that the RNC 107 controls only the maximum rate to be used by the UE 103 on the UL. There is no possibility for the RNC 107 to control, which actual rate below or up to the maximum rate the UE 103 may use. This is rather an autonomous decision by the UE 103 that is associated with the required transmit power of each TFC versus the maximum UE transmit power. If the required transmit power for a TFC for a codec rate (up to the maximum rate) exceeds the maximum UE transmit power, then the UE 103 may autonomously select a lower codec rate associated with a TFC that does not exceed the maximum UE transmit power as described in TS 25.321 and TS 25.133.

Hence, in short, codec rate control in CS UTRAN—as for AMR and AMR-WB in general on all links—is "maximum rate control". The UE 103 may use the maximum rate or a lower rate out of the set of configured rates. The same holds for the downlink.

In certain conditions, like at handovers, other network nodes, like especially the MGW, may also perform rate control actions. For instance, a handover may cause the mobile switching center (MSC) to change the active codec set and the associated MGW will then send Rate Control commands in both directions.

SUMMARY

The proposed solution allows signaling subsets of modes (or rates) in a radio bearer configuration with TFCs for various coding modes. The idea to associate subsets of modes with the provided maximum rate or a codec mode command is an efficient way to switch operation from one subset of codec modes to another. The solution allows keeping the established and standardized concept of maximum rate control with the modification that the mode adaptation is confined to the modes included in the subset of modes that is identified by the maximum rate or the codec mode command. The solution also avoids the problems arising with changing the radio bearer configuration which could be considered a solution in case switching between one set of codec operation modes to another set of operation modes is necessary.

One aspect of the solution is the association of subsets of codec modes to the signaled maximum rate, or respectively the signaled codec mode command. A further aspect of the solution is to constrain rate adaptation to the respective codec modes that are members of the subset of codec modes that is identified by the maximum rate or respectively the codec mode command.

According to an aspect there is presented a method for handling codec rate adaptation in a communication network applying circuit switched communication. The method that is performed by a wireless device comprises receiving an indication of a codec mode and determining a codec mode subset based on the indicated codec mode. The rate adaption is applied based on the codec modes comprised in the determined codec mode subset having a bit rate below or equal to a bit rate associated with the indicated codec mode.

According to an aspect there is presented a method for handling codec rate adaptation in a communication network applying circuit switched communication. The method that is performed by a network node comprises determining a codec mode subset, out of a number of codec mode subsets, which is currently supported by nodes involved in a service, and a maximum allowed bit rate for the service is determined and a codec mode in the determined codec mode subset, associated with a bit rate which is less than or equal to the determined maximum bit rate.

According to an aspect there is presented a wireless device that comprises a processing circuitry that is configured to cause the wireless device to receive an indication of a codec mode and determine a codec mode subset based on the indicated codec mode. The rate adaption is applied based on the codec modes comprised in the determined codec mode subset having a bit rate below or equal to a bit rate associated with the indicated codec mode.

According to an aspect there is presented a network node for supporting rate adaptation. The network node comprises a processing circuitry that is configured to cause the network node to determine a codec mode subset, out of a number of codec mode subsets, which is currently supported by nodes involved in a service. Further, a maximum allowed bit rate for the service is determined and a codec mode in the determined codec mode subset, associated with a bit rate which is less than or equal to the determined maximum bit rate, is indicated.

According to an aspect there is presented a wireless device for supporting rate adaptation. The wireless device comprises a receiving unit that is configured to cause the wireless device to receive an indication of a codec mode. The wireless device further comprises a determining unit that is configured to cause the wireless device to determine a codec mode subset based on the indicated codec mode, and a rate adaptation unit that is configured to cause the wireless device to perform rate adaptation based on the codec modes comprised in the determined codec mode subset having a bit rate below or equal to a bit rate associated with the indicated codec mode.

According to an aspect there is presented a network node for supporting rate adaptation. The network node comprises a first determining unit that is configured to cause the network node to determine a codec mode subset, out of a number of codec mode subsets, which is currently supported by nodes involved in a service, and a second determining unit that is configured to cause the network node to determine a maximum allowed bit rate for the service. The network node further comprises an indicating unit that is configured to cause the network node to indicate a codec mode in the determined codec mode subset associated with a bit rate which is lower than or equal to the determined maximum bit rate.

According to an aspect there is presented a computer program comprising instructions which, when executed by a processor cause an apparatus to receive an indication of a maximum bit rate and determine a codec mode subset based on the indicated maximum bit rate. The rate adaption is applied based on the codec modes comprised in the determined codec mode subset having a bit rate below or equal to the indicated maximum bit rate.

According to an aspect there is presented a computer program comprising instructions which, when executed by a processor cause an apparatus to determine a codec mode subset, out of a number of codec mode subsets, which is currently supported by nodes involved in the service. Further, a maximum allowed bit rate for the service is determined and a bit rate of a codec mode in the determined codec mode subset, which is less than or equal to the determined maximum bit rate, is indicated.

BRIEF DESCRIPTION OF DRAWINGS

The foregoing and other objects, features, and advantages of the technology disclosed herein will be apparent from the following more particular description of embodiments as illustrated in the accompanying drawings. The drawings are not necessarily to scale, emphasis instead being placed upon illustrating the principles of the technology disclosed herein.

FIGS. 9a-c illustrate different implementations of a wireless device according to exemplifying embodiments.

DETAILED DESCRIPTION

Figure 1:
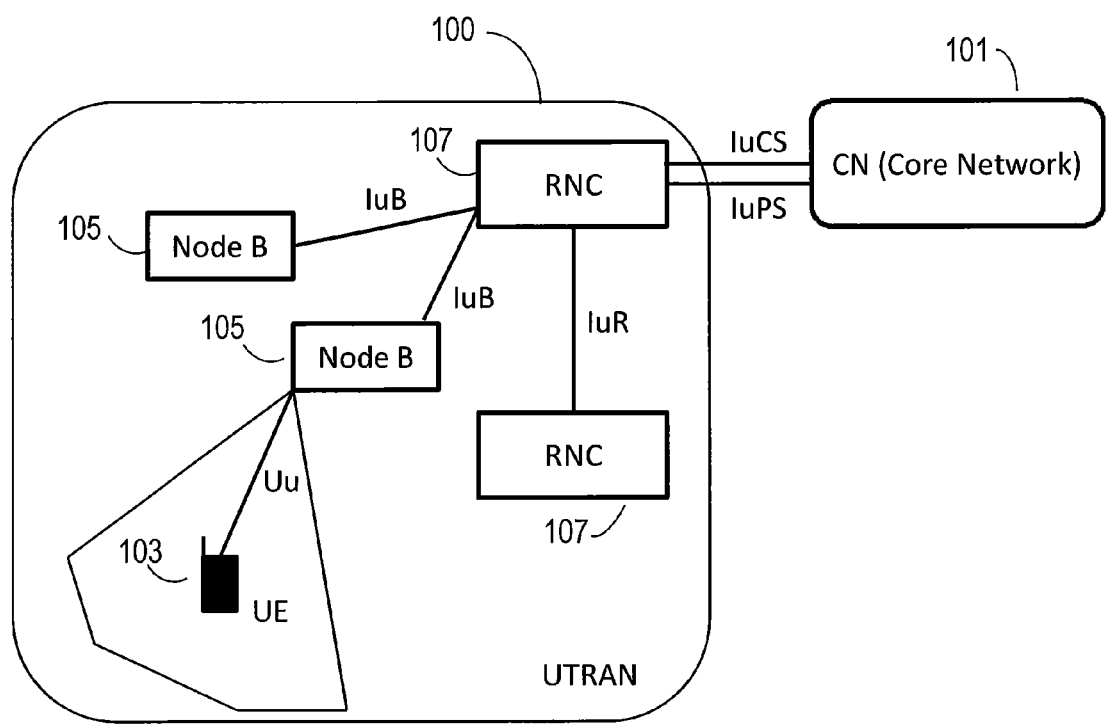
FIG. 1 shows a Universal Terrestrial Radio Access Network (UTRAN) and an associated core network (CN).

When applying the above described maximum rate control for the EVS codec, when the mode set includes both EVS primary modes and EVS IO modes, then problems may occur, as illustrated below.

Firstly, it is assumed that like in the AMR case, an active codec set for EVS codec operation is defined at call setup, for which the MSC and RNC 107 initialize the corresponding RAB subflow combinations towards the CN 101 as well as the corresponding TFCs towards the UE 103. In order to provide best possible speech quality this mode set should comprise at least EVS primary modes.

An example for that is given in the table 2 for "configuration 0", where a "1" indicates that the corresponding EVS primary mode is included in the mode set.

TABLE 2

Example of EVS codec mode configurations with constituent EVS codec modes

| Codec Mode | Configuration (Config-EVS-Code) | | | | |
|---|---|---|---|---|---|
| | 0 | 1 | 2 | ... | N |
| 24.4 EVS primary | | | | ... | ... |
| 16.4 EVS primary | | | | | |
| 13.2 EVS primary | 1 | | 1 | | |
| 9.6 EVS primary | 1 | | 1 | | |
| 8 EVS primary | 1 | | 1 | | |
| 7.2 EVS primary | 1 | | 1 | | |
| 5.9 EVS primary | | | 1 | | |
| 23.85 EVS IO | | | | | |
| 23.05 EVS IO | | | | | |
| 19.85 EVS IO | | | | | |
| 18.25 EVS IO | | | | | |
| 15.85 EVS IO | | | | | |
| 14.25 EVS IO | | | | | |
| 12.65 EVS IO | (a) | (b) | (a) | | |
| 8.85 EVS IO | (a) | (b) | (a) | | |
| 6.60 EVS IO | (a) | (b) | (a) | | |

On top of that it is often necessary to have provisions for handover cases, e.g. SRVCC (Single Radio Voice Call Continuity), that may require the use of EVS IO modes, because the target access after handover may only support AMR-WB and the "remaining" network must then "fallback" to EVS IO.

At least two potential possibilities for that exist:

One possibility (a) is to include the corresponding EVS IO modes into the same mode set, i.e. configuration 0. The included EVS IO modes according to this possibility are indicated in the table with "(a)".

Another possibility is to define a second configuration (configuration 1) that specifies the EVS IO modes as a separate mode set. The included EVS IO modes according to this possibility are indicated in the table with "(b)".

There are problems with both possibilities.

The problem with the first possibility (configuration 0, likewise configuration 2) is related to maximum rate control and the intertwining of EVS primary modes with EVS-IO modes in terms of used bit rate. The problem is specifically caused by the autonomous UE decision to select any lower rate below the maximum rate included in the configuration depending on its transmission power needs. There is hence no possibility for the RNC 107 (or any network node) to command either the adaptation only among EVS primary modes (up to the maximum rate) or only among EVS IO modes (also up to the maximum rate). Rather, the UE 103 may in a non-controllable way adapt, using both EVS primary modes and EVS IO modes. If, for instance, the UE 103 is currently using EVS primary mode 9.6 and it runs into transmit power limitations, it might select the next lower bit rate which corresponds to EVS IO mode 8.85. Hence, switching to EVS IO mode would happen just as a result of the transmit power condition of the UE 103 but not as a result of e.g. a handover that would actually require the use of an EVS IO mode.

The caused problem is that the autonomous mode switching by the UE 103 could lead to the selection of the wrong codec modes. The switching to an EVS IO mode without the actual need, e.g. due to a handover condition would select a codec mode with lower quality than can be provided with the EVS primary modes and is hence undesirable. Even more problematic would be the autonomous switching to an EVS primary mode in case of a connection requiring the use of the EVS IO modes. For instance, a remote legacy AMR-WB-UE would not be able to decode the EVS primary mode frames it would receive in such a case and rather generate silence.

Similar problems may exist not only for UEs but even other nodes within the speech path like the RNC 107 that may perform autonomous maximum rate adaptations.

The problem with the other possibility involving separate configurations is that an undesirable configuration switch during the ongoing call from configuration 0 to configuration 1 would be necessary in order to maintain TrFO. Following the current 3GPP specifications, this is accomplished by a Mid-call negotiation involving a RAB Modification over the Iu interface.

Two main problems with such approach can be highlighted as:

1. The radio bearer configuration needs to be changed to the new one incorporating the configuration 1. This is achieved via a synchronized switch signaled over the RRC protocol which needs to be acknowledged. Besides the delay this will cause in order to use the new configuration (which may be substantial in case the radio conditions are bad and a lot of transmissions need to be sent) the additional signaling also imposes a risk that the complete connection is dropped.
2. The Iu user plane needs to be re-initialized for configuration 1 with new conditions on maximum rate restrictions for the DL. Besides the limited risk of failure and re-transmission over the Iu interface the new maximum rate restriction needs to be sent to the other end/UE to restrict its UL, causing additional signaling and potential drop rate risk. Also as the maximum rate restriction to the other UE may be delayed there is a risk that speech frames cannot be handled in the receiving RNC 107 and needs to be discarded, which will further increase the speech interruption end-to-end.

Different implementation options and functionality exists to shorten the interruption time this may cause, but it is likely that this will cause an interruption that is longer than 1s, which should be added on top of the speech interruption that is experienced at the handover (e.g. SRVCC). Such kind of interruption would hence have substantial negative speech service quality impact.

Another problem occurs even if only EVS primary modes are included in the mode set, because the same bit rate may relate to different audio bandwidths. Signaling a maximum rate does hence not uniquely identify the coding mode with regards to its supported audio bandwidth. A solution would be required to resolve this ambiguity problem.

The solution described herein relates at least to a wireless device; a network node and methods therein for handling codec rate adaptation in a communication network applying circuit switched communication e.g. with limitations as described above.

One aspect of the solution is to modify maximum rate control for EVS in a UE 103 such that the codec modes included in a configuration are structured in subsets. Maximum rate control may then be applied within such a subset, rather than in the complete set of modes contained in the whole configuration. Then, during a voice service, the UE 103 may receive in a first step the allowed maximum rate or a codec mode command.

In a second step the UE 103 may associate the relevant codec mode subset with a received maximum rate or respectively with a received codec mode command. This may be done by identifying which mode subset the signaled maximum rate or respectively the commanded codec mode belongs to.

In a third step, maximum rate adaptation may be done by the UE 103 (if needed) only within the codec modes of the identified subset, not exceeding the maximum rate or respectively the rate associated with the codec mode command and not changing into another mode subset.

If the RNC 107 (or the network in total) needs/wants to change into another mode subset, then the UE 103 may be provided with another maximum rate or respectively codec mode command, identifying the wanted mode subset.

The analog solution applies also to network nodes like MGW or RNC 107 rather than only to UEs.

The solution described herein could be described as a scheme providing seamless rate switching for EVS over CS, for improved transcoder free operation (TrFO).

First, exemplifying embodiments performed by a wireless device will be described with reference to FIGS. 2-3 and 4a-4b, and then embodiments performed by a network node, such as an RNC 107, or another control node will be described with reference to FIGS. 5-6. The embodiments described for a wireless device are also applicable for a network node like an RNC 107 or an MGW, since these network nodes (just as the wireless device) may perform autonomous rate adaptation and this has to be done in proper subsets.

The different codec modes have above been exemplified by EVS primary modes and EVS IO modes available within the EVS standard. However, the solution could also be applied for other coding methods involving configurations comprising different types of coding modes. That is, for configurations where some codec modes are adapted for a first type of equipment having a first type of functionality, e.g. being capable of encoding wideband signals, and where other codec modes are adapted for a second type of equipment which do not have the first type of functionality, and therefore need other coding modes. The second type of equipment may for example only be capable of encoding narrowband signals.

Embodiments described herein enable an adequate rate adaptation for circuit switched services for codec configurations comprising different types of codec modes, as exemplified herein.

Figure 2:
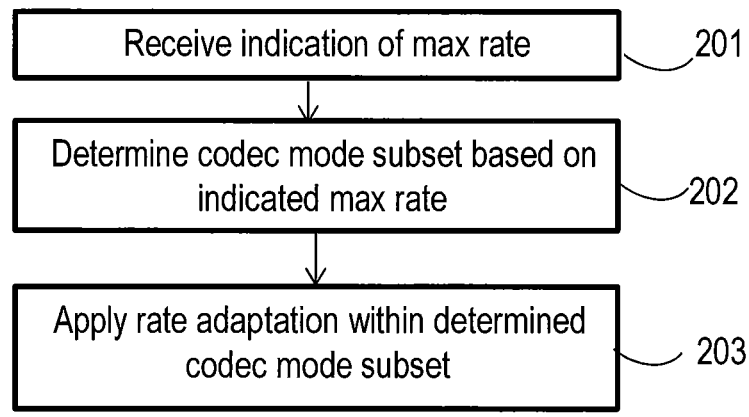
FIGS. 2-3 are flow charts, showing a method performed by a wireless device, e.g. UE, according to exemplifying embodiments. The methods may also be performed by a network node, e.g. RNC or an MGW.

FIG. 2 illustrates a method performed by a wireless device operable in a communication network applying circuit switching. The wireless device may be assumed to be configured with a plurality of codec modes, such as e.g. configuration 0 or 2 shown in table 2. When using one of these configurations from table 2 as an example, it may be assumed in this example that only one bandwidth alternative is available for each EVS primary mode, and that a codec mode subset therefore may be identified based on an associated bit rate. The plurality of codec modes belong to different subsets, where each subset comprises a certain type of codec modes having different characteristics. The wireless device may correspond to a device such as the UE 103 in FIG. 1. The method is suitable for handling different types of codec modes in a communication network applying circuit switched communication. The method comprises receiving 201 an indication of a maximum bit rate. The indication may be received from a network node, e.g. a control node, such as an RNC, a MSC or a MGW. The indication may be received e.g. as an indicator (e.g. Rmax), which could be the actual maximum bit rate, or some other parameter or value, which may have been configured to indicate a maximum bit rate and/or a codec mode subset.

The method further comprises determining 202 a codec mode subset based on the indicated maximum bit rate, or the indicator; and applying 203 rate adaptation, or rate control, based on the codec modes comprised in the determined codec mode subset having a maximum bit rate below or equal to the indicated maximum bit rate. By performing of this method, adequate codec modes may be selected in rate adaptation also when the wireless device is configured with multiple types of codec modes.

The indicated maximum bit rate is associated with a codec mode comprised in the configuration. Thereby, a codec mode may be determined based on the indicated bit rate or an indicator indicating the bit rate. The codec modes comprised in the configuration are classified, divided or arranged, into subsets, e.g. by standard agreement or as part of a configuration procedure. In the example of EVS, one subset could comprise the EVS primary codec modes, e.g. for one bandwidth, and another subset could comprise the EVS IO codec modes. Thus, the codec mode subset may be determined based on the indicated maximum bit rate, assuming that no two codec modes are associated with the same maximum bit rate, and thereby are separable by means of an indicated maximum bit rate. In other embodiments different codec modes may be associated with the same bit rate, which will be described in more detail further below. According to an embodiment, the codec mode subsets are disjoint, i.e. each codec mode is only comprised in one subset, and not in two different subsets. The codec modes comprised in different subsets may have intertwined or interleaved bit rates, as previously described, such that a given bit rate of a codec mode in a first subset may lie between two bit rates of another codec mode subset.

The rate adaptation may be assumed to be performed in association with a circuit switched service, such as a voice call. Rate adaptation as such is previously known, and will therefore not be described detail herein.

Figure 3:
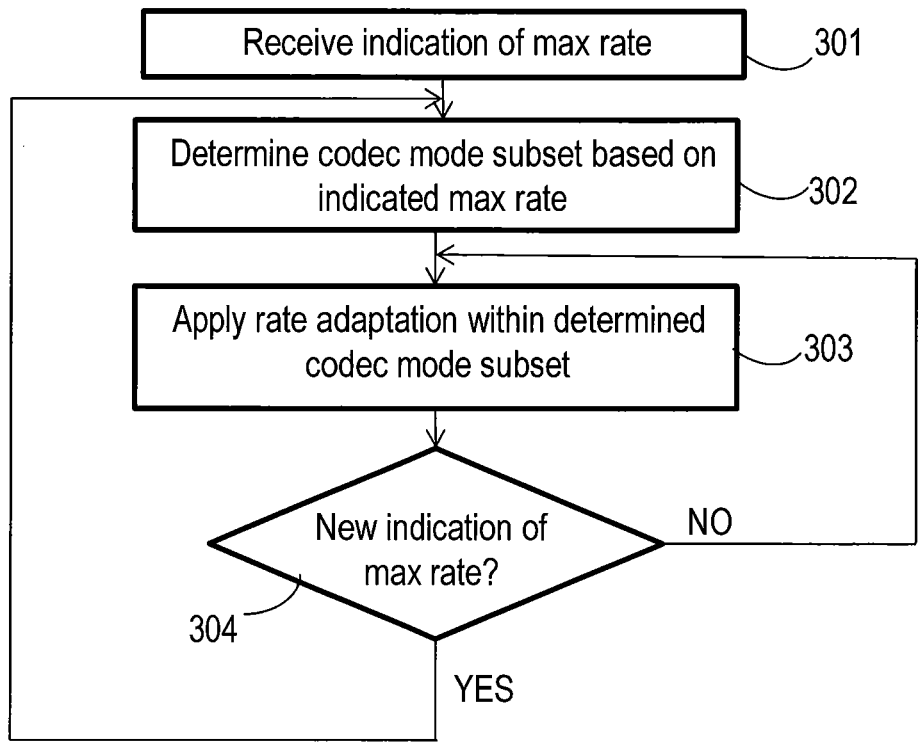

FIG. 3 shows another flowchart of an exemplifying method embodiment to be performed by a wireless device or a network node. The method illustrated in FIG. 3 comprises actions corresponding to the actions illustrated in FIG. 2, and also illustrates that a new indication of a maximum bit rate may be received in an action 304. Upon receiving a new indication of a maximum bit rate, e.g. an indicator Rmax, the wireless device determines 302 a codec mode subset based on the new indicated maximum bit rate or based on the indicator of the new bit rate. Then, rate adaptation may be applied 303 within the determined codec mode subset, i.e. using codec modes comprised in the determined codec mode subset having a bit rate which is lower than or equal to the indicated maximum bit rate.

Figure 4A:
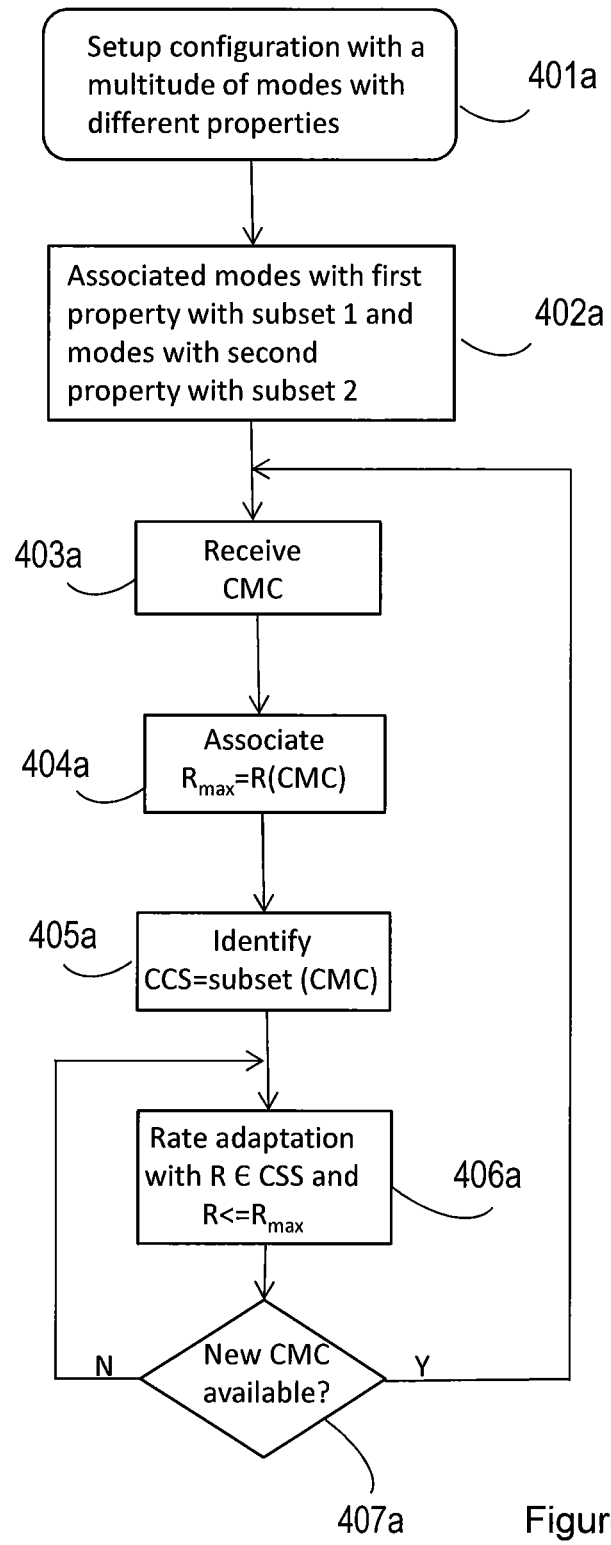
FIGS. 4a and 4b are flow charts, showing a method performed by a wireless device, e.g. UE, or a network node, e.g. RNC or an MGW, according to exemplifying embodiments.

FIG. 4a shows a flowchart illustrating an exemplifying embodiment of a method performed by a wireless device. In this example, the method comprises that the wireless device is configured 401a with a multitude of codec modes with different properties. The modes are associated with different subsets, such that modes with a first property are associated with a first subset and modes with a second property are associated with a second subset, which is illustrated by action 402a. A maximum bit rate is indicated by means of a Codec Mode Command (CMC) 403a, based on which a maximum bit rate is determined 404a. A CMC is a codec mode command indicating a specific codec mode and rate. According to the embodiment illustrated in FIG. 4a, a codec mode subset is determined 405a based on a received CMC, which may alternatively be expressed as that the codec mode subset is determined 405a based on the codec mode indicated by the CMC. Rate adaptation may be applied 406a using codec modes (and bit rates R) belonging to the current subset (CSS) (R∈CSS) which have a bit rate which is lower than or equal to the maximum bit rate. An indication of a new maximum bit rate by means of a CMC may be provided to the wireless device by a network node, which is illustrated as the action 407*a*.

Figure 4B:
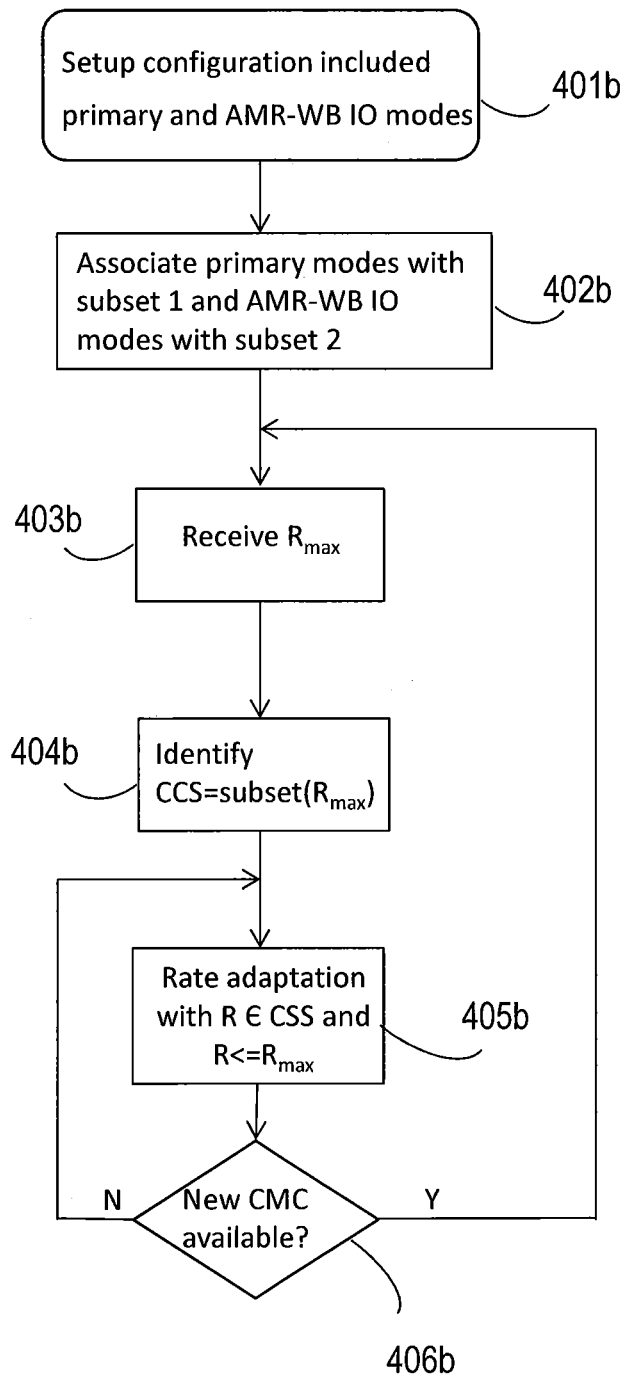

In FIG. 4*b*, another embodiment is illustrated. In this example, the method comprises that the wireless device is configured 401*b* with a set of codec modes comprising primary modes and EVS IO modes (EVS configuration). The codec modes are associated with different subsets, such that the primary modes are associated, e.g. by standard agreement, with a first subset and the EVS IO modes are associated with a second subset, which is illustrated by action 402*b*. An indication of a maximum bit rate (Rmax) is received 403*b* and a current subset, CSS, is identified 404*b* based on the received indicated bit rate or indicator. Rate adaptation may be applied 405*b* using codec modes (and bit rates R) belonging to the CSS (R∈CSS) which have a bit rate which is lower than or equal to the indicated maximum bit rate (R≤Rmax). This rate adaptation may continue until a new indication of a maximum bit rate is received 403*b*. That is, an indication of a new maximum bit rate may be provided to the wireless device by a network node, which is illustrated as the action 406*b*.

In case the codec mode subsets comprise codec modes associated with the same bit rate, such as e.g. EVS primary codec modes for different bandwidths, a maximum bit rate may not be enough to identify or determine a codec mode subset. In such cases, a current codec mode subset, CSS, should preferably be indicated in some other manner than only by an indicated maximum bit rate. For example, an indicator such as CMC may be configured to indicate both a maximum bit rate and a codec mode subset. Such configuration information may be provided to the wireless device e.g. in a setup procedure. It may also be known a priori by standard agreement.

Figure 5:
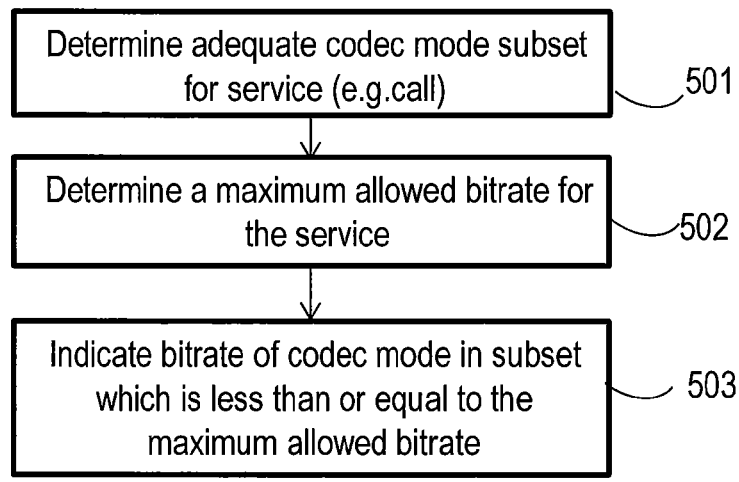
FIGS. 5-6 are flow charts, showing a method performed by a network node, e.g. RNC, according to exemplifying embodiments.

FIG. 5 shows an exemplifying embodiment of a method performed by a network node. The network node may be e.g. an RNC, a MSC or a MGW or some other core network node. The method is to be performed in association with a circuit switched service, such as a voice call. The method may comprise determining 501 a codec mode subset, out of a number of codec mode subsets, which is currently supported by nodes involved in the service, such as wireless devices and network nodes, e.g. UEs and/or RNCs. The method may further comprise determining 502 a maximum allowed bit rate for the service. The method may further comprise indicating 503 a bit rate of a codec mode in the determined codec mode subset which is less than or equal to the determined maximum bit rate, to a wireless device.

Figure 6:
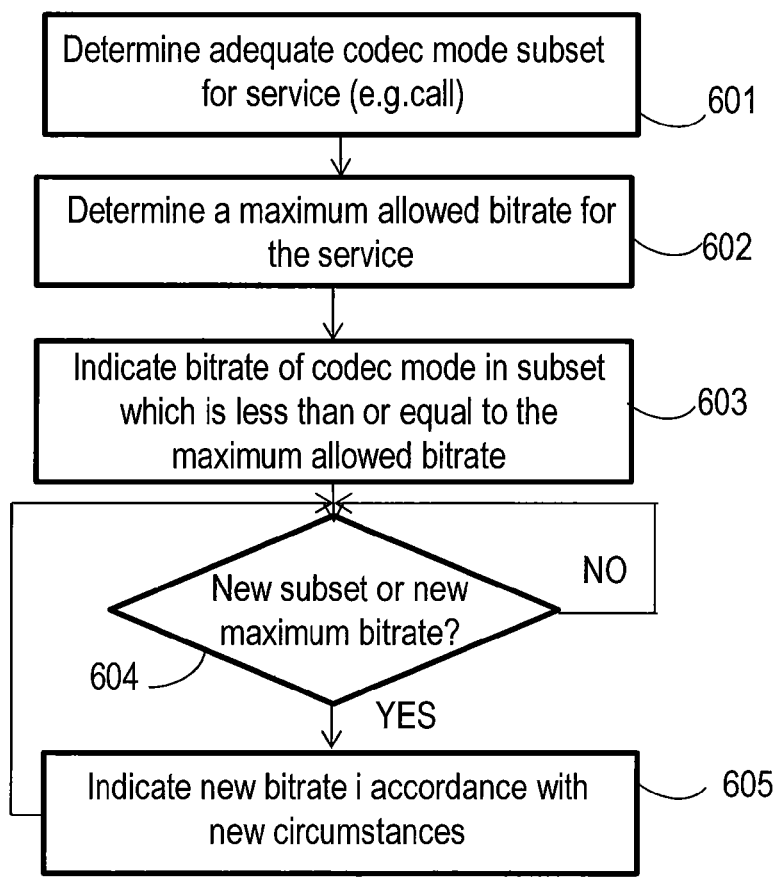

FIG. 6 shows an exemplifying method embodiment to be performed by a network node. The method illustrated in FIG. 6 comprises actions corresponding to the actions illustrated in FIG. 5, i.e., determining a codec mode subset 601 and a maximum allowed bit rate for the service 602, indicating a bit rate of a codec mode in subset which is less than or equal to the determined maximum bit rate 603, and also actions, 604 and 605, associated with a change of codec mode subset and/or of maximum allowed bit rate. When a new situation occurs 604, which entails that the network node determines (YES) that a new subset is to be applied, or that a new maximum bit rate within the currently applied subset is to be applied, a new bit rate corresponding to this new situation is indicated 605 to the wireless device.

In correspondence with what is described above for a wireless device, in cases where the codec mode subsets comprise codec modes associated with the same bit rate, the indicating of a maximum bit rate may not be enough to identify or signal a codec mode subset to another network node, such as a wireless device. In such cases, a current codec mode subset, CSS, should preferably be indicated in some other manner than only by an indicated maximum bit rate. For example, an indicator may be configured to indicate both a maximum bit rate and a codec mode subset. Such configuration information may be provided to concerned network nodes, e.g. in a setup procedure.

Figure 7:
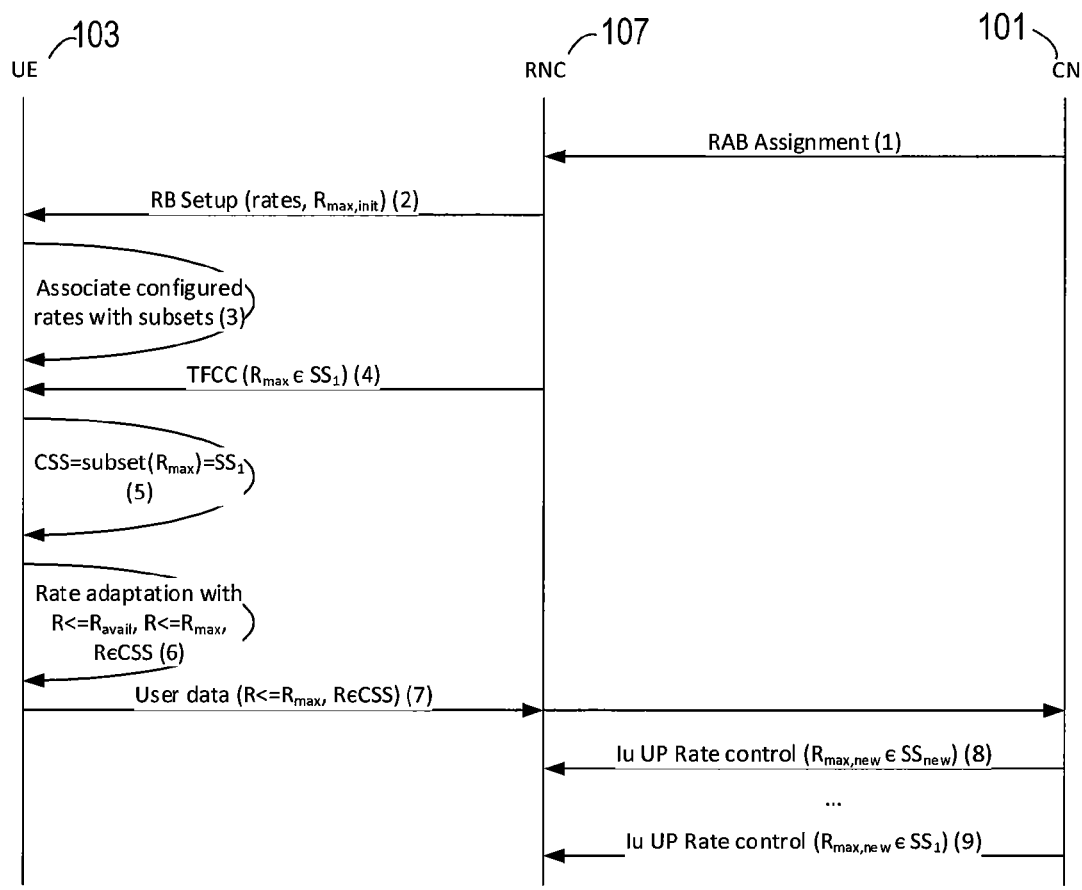
FIG. 7 is a signaling diagram exemplifying a flow of protocol messages among UE, RNC and CN according to an exemplifying embodiment.

In a detailed example, assuming a scenario of 3GPP UTRAN and EVS, the method may work as follows, referring to FIG. 7. During call setup the RNC 107 receives a RAB assignment request with EVS primary mode rates and EVS IO mode rates, point (1). In turn the UE 103 is setup with a radio bearer configuration with TFCs for these rates of the EVS primary modes and the EVS IO modes, point (2). Part of this setup is also an initial rate selection to a rate $R_{max,init}$. Part of the RAB assignment is also the setting of the guaranteed bit rate (GBR) to at least some minimum codec rate. The GBR would typically be chosen to be the minimum EVS IO rate, which will ensure TrFO even after a potential handover requiring the use of an AMR-WB mode. The UE 103 may limit the configured rates by an internal maximum rate restriction but the configuration will at least contain all rates below this minimum EVS IO codec rate.

As an example the setup may correspond to configuration 0 according to table 2 above. This configuration contains the EVS primary modes 7.2, 8.0, 9.6 and 13.2 indicated by "1" and the EVS IO modes 6.60, 8.85, and 12.65 indicated by "(a)". For DTX operation TFCs for EVS primary SID and EVS IO SID are also configured. The initial rate is one rate of the EVS primary modes, e.g. 13.2. For backward compatibility reasons the initial rate may also be chosen to a low EVS IO mode rate, e.g. 6.60.

The UE 103 is made aware, e.g. by standard agreement or some other type of a priori information, of the additional information that the rates associated with the primary modes (i.e. 7.2, 8.0, 9.6 and 13.2) constitute one subset of rates or codec modes, and that the rates associated with the EVS IO modes (i.e. 6.60, 8.85, and 12.65) constitute a second disjoint subset of rates or codec modes, point (3). In the application layer the configured TFCs are associated with the EVS codec (NAS Synchronization ID) and additionally said subsets of rates are per standard agreement associated with EVS primary modes and EVS IO modes, respectively. The UE application layer knows per standard agreement that it is not allowed to switch between these subsets without explicit TFCC message from the RNC 107.

The codec mode rate adaptation control procedure in the UE 103 may, during the call, receive TFCC messages with IEs indicating a potentially changed maximum allowed rate $R_{max}$, point (4). As an example, a new maximum allowed rate could be 9.6 kbps. This means that all configured codec modes and corresponding TFCs that require a higher rate are disallowed, or excluded from use. According to this example of the solution described herein, the codec mode rate adaptation control procedure identifies the current subset (CSS) of rates that is associated with the indicated maximum rate $R_{max}$, point (5). In the example of a maximum rate of 9.6 kbps, this association yields the subset of the EVS primary modes among which rate adaptation is allowed up to the maximum rate. This means that adaptation must be done among the primary modes with rates 7.2, 8.0, 9.6 kbps. An example of rate adaptation in response to UE transmit power may be detailed as follows.

The UE 103 continuously monitors the state of each configured TFC based on its required transmit power versus the maximum UE transmit power. Depending on whether—based on this monitoring—the number of supported TFCs change, a corresponding newly available, i.e. achievable or possible, bit rate is reported to the upper layers (particularly the application layer) in order to facilitate a corresponding adaptation of the used codec mode. The newly available bit rate may be higher or lower than a previous available bit rate. At this stage, the codec mode adaptation control procedure selects a codec mode with a bit rate which is less or equal to the reported available bit rate and less or equal to the maximum allowed bit rate $R_{max}$. Note that the application, e.g., encoder, may also choose a rate below the maximum rate, which is a typical case for e.g. DTX or VBR (Variable Bit Rate) operation. Additionally, according to this example of the solution described herein, the newly selected codec mode is chosen from the subset of codec modes associated with the allowed maximum rate as indicated from the network, point (6). According to the example, based on the monitoring of the maximum transmit power, it might be possible that the bit rate of 9.6 kbps is not supported any longer, e.g. due to the currently available maximum transmit power, and rather the bit rate of 8.85 would be the newly available bit rate. Adaptation control would, however, in that case choose the highest possible bit rate of the subset of EVS primary modes, which is 8.0 kbps, even though there is a codec mode in another subset with a bit rate of 8.85 kbps. However, the mode with bit rate 8.85 kbps belongs to the disallowed or forbidden EVS IO subset.

Accordingly, the speech user data sent on the UL (from the UE 103) and further from the RNC 107 to the CN 101 has a rate below or equal to the indicated allowed maximum rate and additionally this rate is one rate out of the CSS of rates associated with the maximum rate, point (7).

In case a condition arises based on which an RNC or network based rate adaptation control chooses to switch to a different subset $SS_{new}$ of EVS codec modes, the RNC or network based rate adaptation control will provide, to the UE 103, a corresponding adaptation request of the maximum rate. The new maximum rate will then be a rate out of this new subset of codec modes that shall be used after successful adaptation, point (8). As an example, the condition may arise that the connection cannot be continued with the EVS primary modes but only with the EVS IO modes. In that example, an adaptation request will be sent to the UE 103 changing the maximum rate from 9.6 to 8.85 kbps. This causes the codec mode adaptation control to apply rate adaptation only among the subset of EVS IO modes that do not exceed the maximum rate of 8.85 kbps, namely among 8.85 and 6.60 kbps.

The returning from the use of the new subset of modes (e.g. EVS IO modes) to the initial subset of modes (e.g. EVS primary) is performed in an analog way, point (9). The UE 103 will be provided with an adaptation request for the maximum rate with a rate out of the subset comprising EVS primary modes, e.g. 9.6 kbps. In that case the codec mode rate adaptation control procedure in the UE 103 will switch back to the subset of EVS primary modes that are less or equal to the indicated maximum rate of 9.6 kbps, i.e. 7.2, 8 and 9.6 kbps.

As a general note on the foregoing description, in order to provide the possibility for a seamless switching between the EVS IO modes and the primary EVS codec modes a pre-requisite is that the radio configuration at least contains one codec rate of each subset.

Given that the maximum rates, conveyed to the UE 103, control also the choice of codec mode subsets, it may be necessary that at least some network nodes within the speech path should be aware of this kind of subset selection and the way of controlling the rate adaptation within the CSS. If e.g. the RNC 107 encounters a condition in which it selects to modify the maximum rate, but otherwise has not received a control message requiring changing the CSS of modes, the rate adaptation may be done within the rates belonging to the CSS. The RNC 107, if sending subset-specific TFCC messages, should preferably hence know the active subset. For example, if a configuration is used according to configuration 0 of table 2 and if currently EVS primary mode 9.6 is used, the RNC 107 shall only change the maximum rate among the other rates of the subset of configured EVS primary rates (7.2, 8 or 13.2). The analog principle would apply for any other subset. Hence, the controlling of the CSS of rates, among which local rate adaptation may be performed by means of associating the subset with a received maximum rate, shall not only apply for UEs but shall even apply for network nodes and the whole speech path. However, the need for a node like the RNC 107 to be aware of the subsets and the subset selection is generally undesirable. In order to avoid such impact and the resulting implementation needs it is preferable to use the above described alternative, where the RNC 107 can remain application-agnostic. The need for a node like the RNC 107 to be aware of the subsets and the subset selection may also be avoided if e.g. upper layers can guarantee that the correct subset is selected.

There are various conceivable mechanisms for a network node, such as an RNC or the network to convey rate adaptation requests or commands to a wireless device such as a UE. One possibility is the currently standardized way to use transport format combination control, TFCC, messages (see e.g. 3GPP TS 25.331). Upon reception of such a message specifying a new maximum codec mode rate, the UE may forward this rate to the upper layers and particularly to the codec mode rate adaptation control procedure or function.

An alternative way of conveying rate adaptation requests to the UE 103 is the transmission of a codec mode request (CMR) together with the speech payload in the User Plane, instead of the TFCC message in the Control Plane. This alternative may be referred to as inband signaling. According to this alternative, a CMR is provided along with the downlink speech payload data to the UE 103. After reception the CMR is provided to the upper layer, i.e. to the encoder or to the decoder, like the speech payload data representing the coded speech frame. In the upper layer the CMR is forwarded to the codec mode rate adaptation control procedure or function.

Another possibility is to use both TFCC messages and inband CMR messages, e.g. concurrently, for maximum rate control. It may, for instance, be the case that TFCC messages generated by the RNC 107 are used to make rate adaptations in response to the local radio network requirements of the UL, while rate adaptation requests reflecting needs of the core network 101 or a remote DL may be conveyed by CMRs. The codec mode rate adaptation control procedure of the UE 103 will then combine these adaptation requests. One possibility is that two concurrent adaptation request messages, e.g. one conveyed in a TFCC message and one conveyed in an inband CMR, are combined applying a so-called minimum operation. This means that the maximum allowed rate is calculated as the minimum of the rate requests conveyed by the TFCC message and the inband CMR.

In the case that TFCC messages and inband CMR messages are concurrently used for maximum rate control it may be that the RNC 107 (issuing the TFCC messages) is not aware of conditions requiring a change of the subset of codec modes among which rate adaptation is allowed. For instance, only a core network node (like MSC or MGW) may be aware of a condition at the remote end, which requires switching from one codec mode subset to another. As an example, a remote UE 103 involved in the circuit switched service may roam into a cell that supports only AMR-WB but not the primary modes of the EVS codec. Alternatively, the remote UE 103 may be handed over to a cell only supporting NB speech The preferred solution for such kind of cases is that the maximum rate conveyed by the CMRs received from the network is used to identify the CSS of rates (example: EVS IO rates or EVS-NB modes), among which the UE 103 may perform rate adaptation. The rate adaptation within this CSS is then done up to a maximum rate that is the minimum of the rate requests conveyed by the TFCC message and the inband CMR. This means that the TFCC message sets only the maximum bit rate, while the CMR sets the CSS. More specifically, the TFCC messages control only the 'local' maximum bit rate of the UL while the CMR sets the CSS and the 'remote' maximum bit rate according to the needs of the remote downlink and other potential constraints of any network node within the speech path.

It is to be noted that the RNC 107 steers the maximum bit rate to be used on its local DL via issuing corresponding Iu UP control messages towards the CN 101. If the RNC 107 is application-agnostic, the maximum rate requests may not correspond to the CSS of rates that should be used. It is hence preferable that a CN node like MGW makes sure that the requested maximum rate corresponds to the CSS of rates. If the maximum rate request received from the RNC 107 does not correspond to a rate of the CSS, the maximum rate request has to be reduced to the closest rate out of the CSS of rates that is less or equal to the rate requested by the RNC 107. For the solution using CMRs as described above this operation could preferably be done at the same instant when converting Iu UP messages to CMR.

A further possibility allowing to keep the RNC 107 application-agnostic would be to change the RNC maximum rate control operation for its local UL in such a way that it does not issue autonomous maximum rate adaptation requests directly to the UE 103. Rather, as described for the DL in the above paragraph, the RNC 107 could send Iu UP rate control messages for its own UL to the CN node (MGW) which can modify the maximum rate request such that the CSS would not be changed. The MGW would then send back to the RNC 107 the potentially modified maximum rate request where the maximum rate request has been modified to the closest rate out of the CSS of rates that is less or equal to the rate originally requested by the RNC 107. This maximum rate for the UL could then safely be transmitted to the UE 103 by using TFCC messages or even CMR.

In summary, the RNC 107 should generally not be application-aware and not aware of the defined subsets. Without this knowledge it is not possible for the RNC 107 to generate TFCC messages and Iu UP messages for the maximum rate control that simultaneously correctly steer the use of the codec mode subsets according to the needs of the remote UE or the CN 101. Hence either the TFCC messages and Iu UP messages have be defined in a mode subset independent way, enabling the RNC 107 to use this signaling mechanism for maximum rate control without knowing the end-to-end requirements with regards to codec mode subsets to be used. Or the network has to inform the RNC 107 of the mode subset to be respected when performing maximum rate control using the TFCC and the Iu UP messages. There are hence the following possible solutions to that problem.

a) The TFCC messages and Iu UP messages are specified merely for maximum bit rate control while the CMR defines the mode-set. This alternative is preferable as it keeps the RNC 107 application-agnostic.

b) The RNC 107 sends maximum rate control messages even for the local UL to a CN node that controls that the requested rate does not imply unintentionally changing the CSS. The CN node then returns correspondingly rectified maximum rate control messages. The RNC 107 sends no autonomous maximum rate control TFCC messages to the UE 103 but only maximum rate control messages in response to corresponding maximum rate control messages received from the CN node. This alternative is preferable as it keeps the RNC 107 application-agnostic.

c) The RNC 107 knows the application specific mode subsets—including the extension to different audio bandwidth (EVS-NB, EVS-WB, EVS-SWB, EVS-FB, EVS-IO); then the RNC 107 can send the TFCC and Iu UP messages accordingly. This solution requires that the CN 101 informs the RNC 107 about the subsets or at least of the CSS. The solution also requires the definition of new TFCC and Iu UP messages.

d) The TFCC and Iu UP messages are abandoned for maximum rate control and CMR alone specifies the mode subset and the maximum rate. This may offload the air interface from TFCC messages, but again requires from the RNC 107 an application-aware handling of the CMRs and knowledge about the subsets or at least which of the CSS.

Embodiments of the invention have been illustrated with the example of two configured subsets of codec modes which are the EVS primary modes and respectively the EVS IO modes. Extensions are possible to other subsets of modes, like e.g. modes with different bandwidth capabilities, where one subset of modes could be narrowband modes, a second subset could be wideband modes, and a third subset comprising super-wideband modes. It is also possible to associate the instantaneous rates of the VBR 5.9 kbps mode (i.e. 2.8, 7.2, 8 and EVS primary SID) with a separate subset.

There may even be the case that modes belonging to different subsets have the same bit rate. As an example there could be codec modes with different properties but operating at the same respective bit rates. As an example there could be a first subset of NB modes and a second subset of WB modes, both defined for the same rates of 7.2, 8, 9.6 and 13.2 kbps. A generalization of the solution is possible for that case. According to this embodiment, after the setup of the radio bearer configuration with these modes with different properties these modes are first associated with disjoint subsets according to their different properties. The NB modes could for instance be associated with a first subset and the WB modes with a second subset. During operation the UE 103 (or a network node) obtains codec mode commands (CMC) rather than IEs signaling the maximum rate directly. Each received CMC is subsequently associated with a corresponding maximum rate and a subset of codec modes among which maximum rate control is allowed. If a new CMC is available, e.g. in case a handover requires the change of the subset of codec modes the procedure is repeated with the newly received CMC. FIG. 4a contains a flowchart illustrating this solution. FIG. 4b contains a similar flowchart where, however, the maximum rate is signaled directly rather than the CMC. In the example of FIG. 4b a configuration is used with EVS primary modes (subset 1) and EVS IO modes (subset 2).

The described embodiment can also be extended to work with a radio bearer configuration with the EVS primary VBR 5.9 mode and a number of constant rate EVS primary modes, in addition to configured EVS IO rates. This configuration is identical to the above discussed configuration 0 except for the additional 5.9 VBR mode. It is illustrated in table 2 as configuration 2. The VBR 5.9 mode requires TFCs for the instantaneous rates 2.8, 7.2, 8 and for EVS primary SID. In addition it is assumed that TFCs are configured for constant rate EVS primary modes 7.2, 8, 9.6 and 13.2 and for the EVS IO modes 6.6, 8.85 and 12.65. Even though the VBR mode requires the TFCs as listed above for its operation, the VBR mode is associated only with a first subset containing its maximum instantaneous rate 8.0 kbps as the only rate. This is necessary since the source controlled VBR mode may for any frame require transmission with 8.0 kbps instantaneous rate and rate adaptation to a lower rate than this maximum might hence not provide the required TFC for the transmission of that maximum instantaneous rate. The constant rate EVS primary modes are associated with a second subset. If the network issues CMCs for any of the constant rate modes or the EVS IO modes, the rate associated to this CMC is used as maximum rate up to which rate adaptation among the modes out of the respective subset of constant bit rate EVS primary modes or EVS IO modes is performed. If the network issues a CMC for the VBR mode, operation is constrained to VBR. Rate adaptation to any of the constant rate modes and especially to the 7.2 CBR mode that is below the configured 8 kbps maximum rate is excluded.

Figure 8:
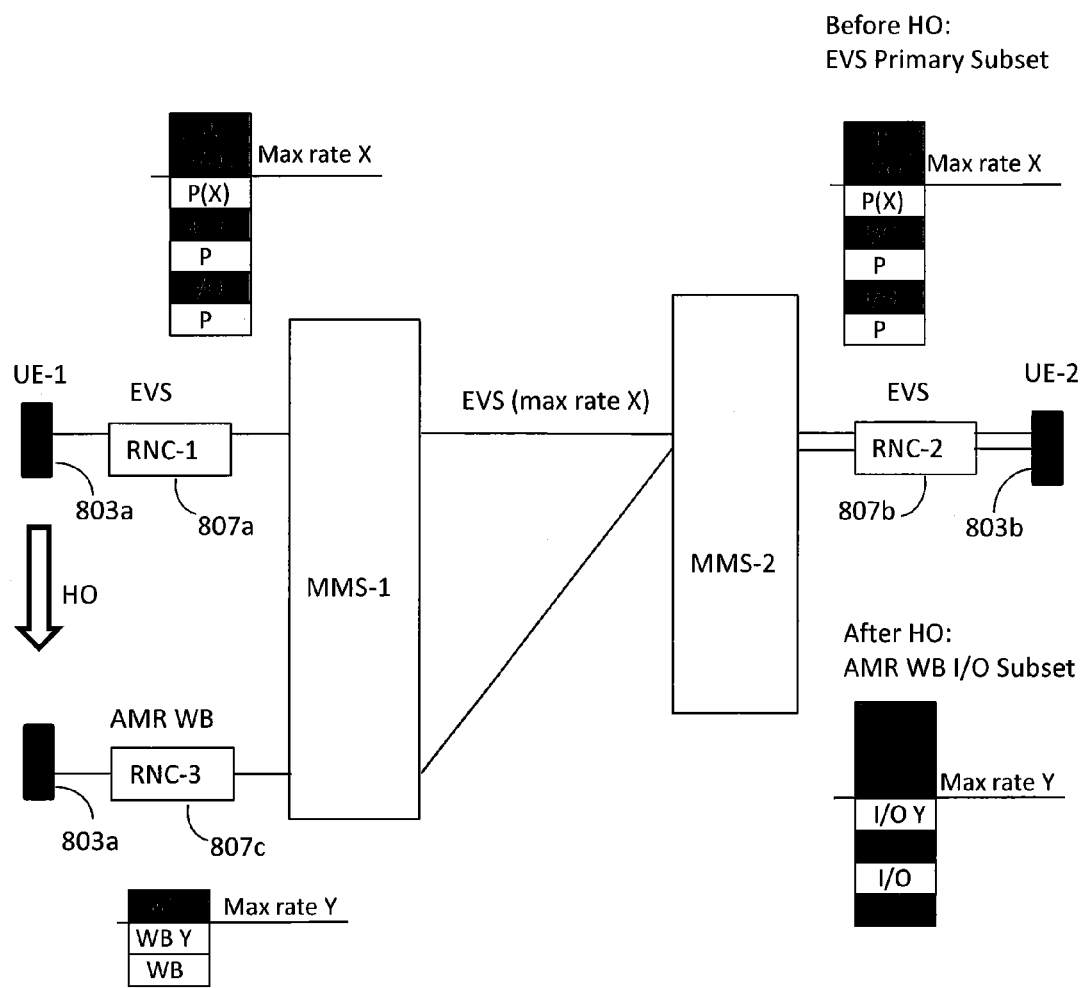
FIG. 8 is a schematic view of a communication network and use of different codec mode subsets before and after a handover, according to an exemplifying embodiment.

FIG. 8 depicts a system view of an example embodiment of the solution described herein. UE-1 803a has a speech service connection with UE-2 803b. UE-1 803a is initially served by RNC-1 807a but roams during the call to another cell that is served by RNC-3 807c. UE-2 803b is served by RNC-2 807b. While all network nodes in the initial connection via RNC-1 807a support the new EVS codec, this is not the case after the handover of UE-1 803a to the cell served by RNC-3 807c. After the roaming to the serving RNC-3 807c, EVS primary codec modes are no longer supported, since the RNC-3 807c only supports AMR-WB. The call is initially setup, via RNC-1 807a, with a configuration including EVS primary modes and EVS IO modes. Furthermore, the call is initially operated with EVS primary modes up to a maximum rate X=13.2. Rate control in both directions between UE-1 803a and UE-2 803b is performed using the subset of configured EVS primary modes with a rate not exceeding the maximum rate. Given that the maximum rate belongs to the subset of EVS primary rates, EVS IO rates are prohibited for rate adaptation (greyed out in the figure).

The handover to the serving RNC-3 807c causes that the speech connection will need to be operated with the EVS IO modes and with AMR-WB respectively. The switching to the subset of EVS IO modes is initiated by changing the maximum rate to a rate out of the subset of EVS IO rates, e.g. Y=12.65. This is a signal to all involved network nodes to perform operation only using the subset of EVS IO rates. EVS primary rates are now prohibited for rate adaptation (greyed out). It is to be noted that there is not a strict need for a node like the RNC to be aware of the subsets and the subset selection provided that e.g. upper layers can guarantee that the correct subset is selected or if any of the provided solution keeping the RNC application-agnostic is used. In this exemplifying embodiment it is assumed that the codec mode subsets may be identified based on a maximum bit rate.

The methods and techniques described above may be implemented in wireless devices and network nodes. Above, in association with describing the method embodiments, it is exemplified in which nodes e.g. in an UTRAN system the methods are intended to be implemented. Corresponding nodes in other communication systems may be denoted differently.

An exemplifying embodiment of a wireless device, such as a UE, is illustrated in a general manner in FIG. 9a. The wireless device 900 is configured to perform at least one of the method embodiments described above with reference to any of FIGS. 2-4b. That is, the wireless device 900 may be configured to perform a method according to a perspective of one wireless device involved in the different embodiments described above. The wireless device 900 may be assumed to be associated with the same technical features, objects and advantages as the previously described method embodiments. The node will be described in brief in order to avoid unnecessary repetition.

The wireless device may be implemented and/or described as follows.

The wireless device 900 is configured for supporting rate adaptation. The wireless device 900 may comprise processing circuitry 901 and a communication interface 902. The processing circuitry 901 is configured to cause the wireless device 900 to perform actions associated with any of the method embodiments described above. The communication interface 902, which may also be denoted e.g. Input/Output (I/O) interface, may include a network interface for sending data to and receiving data from other network nodes.

The processing circuitry 901 could, as illustrated in FIG. 9b, comprise processing means, such as a processor 903, e.g. a CPU, and a memory 904 for storing or holding instructions. The memory would then comprise instructions, e.g. in form of a computer program 905, which when executed by the processing means 903 causes the wireless device 900 to perform any of the actions described above. Such a computer program could alternatively be carried by or stored on a carrier before and/or during the use of the computer program.

An alternative implementation of the processing circuitry 901 is shown in FIG. 9c. The processing circuitry here comprises functional units, such as a receiving unit 906, configured to cause the wireless device to receive an indication of a maximum bit rate originating from a network node, such as an RNC, MSC or MGW. The processing circuitry may further comprise e.g. a determining unit 907, configured to cause the wireless device to determine or identify a codec mode subset based on the indicated maximum bit rate or on an indicator thereof. The processing circuitry may further comprise a rate adaptation unit 908, configured to cause the wireless device to perform rate adaptation, or rate control, based on the codec modes comprised in the determined codec mode subset, having a maximum bit rate below or equal to the indicated maximum bit rate. The processing circuitry could comprise more units, and actions or tasks could alternatively be performed by one of the other units.

The wireless device(s) described above could be configured for any of the separate features of the different method embodiments described herein. The wireless device 900 may be assumed to comprise further functionality, for carrying out regular functions.

The functionality described above could also be implemented in a network node in a similar manner. Below some further aspects related to a network node will be described.

Figure 10A:
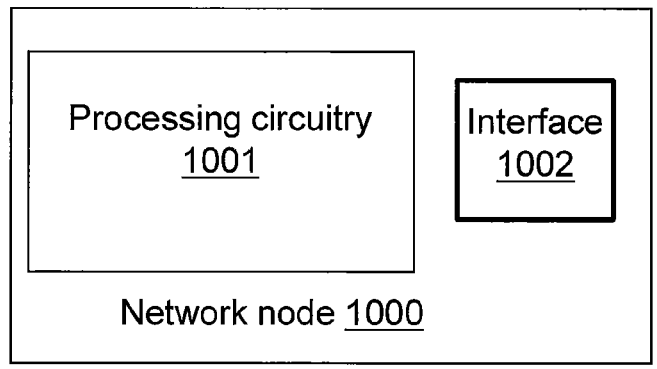
FIGS. 10a-c illustrate different implementations of a network node according to exemplifying embodiments.

An exemplifying embodiment of a network node, such as an RNC, an MSC or an MGW, is illustrated in a general manner in FIG. 10a. The network node 1000 is configured to perform at least one of the method embodiments described above with reference to e.g. any of FIGS. 5-6. That is, the network node 1000 may be configured to perform a method according to a perspective of one network node involved in the different embodiments described above. The network node 1000 may be assumed to be associated with the same technical features, objects and advantages as the previously described method embodiments. The node will be described in brief in order to avoid unnecessary repetition.

The network node may be implemented and/or described as follows.

The network node 1000 is configured for supporting rate adaptation. The network node 1000 may comprise processing circuitry 1001 and a communication interface 1002. The processing circuitry 1001 is configured to cause the network node 1000 to perform actions associated with any of the method embodiments described above. The communication interface 1002, which may also be denoted e.g. Input/Output (I/O) interface, may include a network interface for sending data to and receiving data from other network nodes.

Figure 10B:
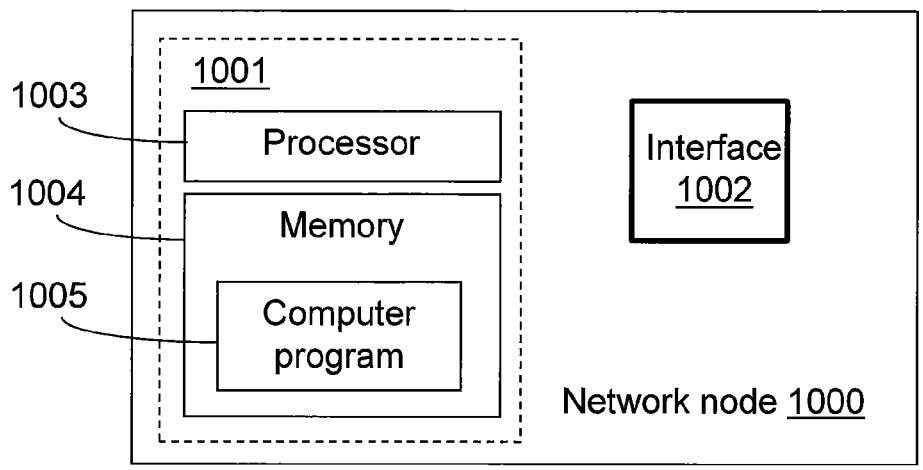
Figure 10C:
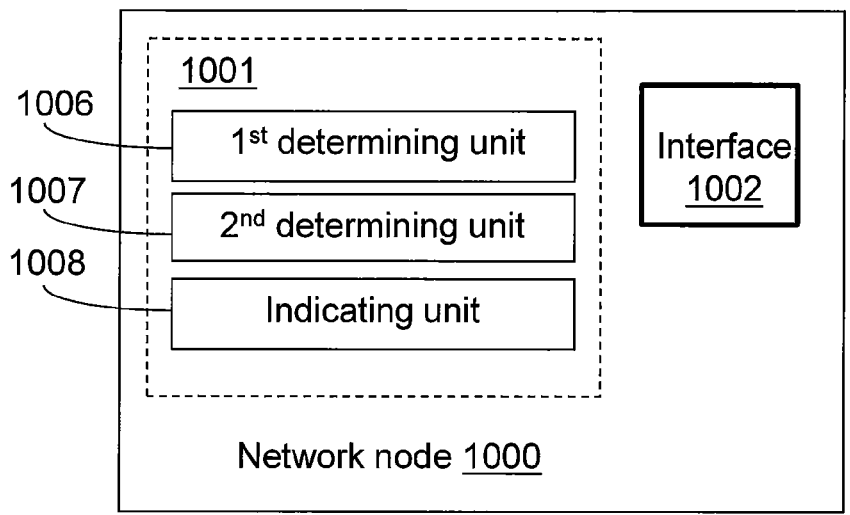

The processing circuitry 1001 could, as illustrated in FIG. 10b, comprise processing means, such as a processor 1003, e.g. a CPU, and a memory 1004 for storing or holding instructions. The memory would then comprise instructions, e.g. in form of a computer program 1005, which when executed by the processing means 1003 causes the network node 1000 to perform any of the actions described above. Such a computer program could alternatively be carried by or stored on a carrier before and/or during the use of the computer program An alternative implementation of the processing circuitry 1001 is shown in FIG. 10c. The processing circuitry here comprises functional units, such as a first determining unit 1006, configured to cause the network node to determine or identify a codec mode subset, out of a number of codec mode subsets, which is currently supported by nodes involved in a service. The processing circuitry may further comprise a second determining unit 1007, configured to cause the network node to determine or identify a maximum allowed bit rate for the service. The processing circuitry may further comprise an indicating unit 1008, configured to cause the network node to indicate a bit rate of a codec mode in the determined codec mode subset which is lower than or equal to the determined maximum bit rate and/or to indicate a codec mode subset, e.g. in case multiple codec mode subsets comprise modes associated with the same rate. The processing circuitry could comprise more units, and actions or tasks could alternatively be performed by one of the other units.

The network node(s) described above could be configured for the different method embodiments described herein. The network node 1000 may be assumed to comprise further functionality, for carrying out regular functions.

Within the context of this disclosure, the term "wireless device" or "wireless terminal" encompasses any type of wireless node which is able to communicate with a network node, such as a base station, or with another wireless device by transmitting and/or receiving wireless signals. Thus, the term "wireless device" encompasses, but is not limited to: a user equipment, a mobile terminal, a stationary or mobile wireless device for machine-to-machine communication, an integrated or embedded wireless card, an externally plugged in wireless card, a dongle, etc. Throughout this disclosure, the term "user equipment", "UE" is sometimes used to exemplify various embodiments. However, this should not be construed as limiting, as the concepts illustrated herein are equally applicable to other wireless devices. Hence, whenever a "UE" is referred to in this disclosure, this should be understood as encompassing any wireless device as defined above.

It should be appreciated that although examples herein refer to an RNC for purposes of illustration, the concepts described apply also to other network nodes having a corresponding function, but denoted differently. The expression network node, as used in different versions in this disclosure is intended to encompass any type of RNC, MSC or MGW, or other core network node operable to be involved in rate adaptation of circuit switched services in a communication network.

It should be noted that expressions like "rate adaptation", "rate control" and "rate adaptation control" may be used as synonyms herein.

It should be noted that although terminology from 3GPP UTRAN has been used in this disclosure to exemplify the invention, this should not be seen as limiting the scope of the invention to only the aforementioned system. Other wireless systems having a limited possibility of adequate rate adaptation control in the manner described herein may also benefit from exploiting the ideas covered within this disclosure.

This document may comprise abbreviations, which are not explained in the text. An explanation to these abbreviations may be found in 3GPP documents, such as TS 25.401, or 3GPP TSs 26.441 through 26.451, and other specifications referred to therein. The steps, functions, procedures, modules, units and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules, units and/or blocks described above may be implemented in software such as a computer program for execution by suitable processing circuitry including one or more processing units. The software could be carried by a carrier, such as an electronic signal, an optical signal, a radio signal, or a computer readable storage medium before and/or during the use of the computer program in the network nodes.

The network node described above may be implemented in a so-called cloud solution, referring to that the implementation may be distributed, and the network node may be so-called virtual node or virtual machine.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors, DSPs, one or more Central Processing Units, CPUs, and/or any suitable programmable logic circuitry such as one or more Field Programmable Gate Arrays, FPGAs, or one or more Programmable Logic Controllers, PLCs. That is, the units or modules in the arrangements in the different nodes described above could be implemented by a combination of analog and digital circuits, and/or one or more processors configured with software and/or firmware, e.g. stored in a memory. One or more of these processors, as well as the other digital hardware, may be included in a single application-specific integrated circuitry, ASIC, or several processors and various digital hardware may be distributed among several separate components, whether individually packaged or assembled into a system-on-a-chip, SoC.

It should also be understood that it may be possible to re-use the general processing capabilities of any conventional device or unit in which the proposed technology is implemented. It may also be possible to re-use existing software, e.g. by reprogramming of the existing software or by adding new software components.

The embodiments described above are merely given as examples, and it should be understood that the proposed technology is not limited thereto. It will be understood by those skilled in the art that various modifications, combinations and changes may be made to the embodiments without departing from the present scope. In particular, different part solutions in the different embodiments can be combined in other configurations, where technically possible.

When using the word "comprise" or "comprising" it shall be interpreted as non-limiting, i.e. meaning "consist at least of".

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

The invention claimed is:

1. A method for handling codec rate adaptation in a communication network applying circuit switched communication, wherein the method is performed by a wireless device, the method comprising:
    operating processing circuitry of the wireless device to perform operations comprising:
    receiving an indication of a codec mode, wherein the indication of the codec mode is configured to indicate at least a maximum bit rate for a codec mode;
    determining a codec mode subset based on the indicated codec mode,
        wherein codec modes with a first property are associated with a first codec mode subset and codec modes with a second property are associated with a second codec mode subset, and the first property corresponds to Enhanced Voice Services (EVS) primary modes and the second property corresponds to EVS Adaptive Multi-Rate Wideband (AMR-WB) interoperability (IO) modes, and wherein codec modes with different bandwidth capabilities are associated with different codec mode subsets, wherein the EVS primary modes and the EVS AMR-WB IO modes and within the EVS standard; and
    applying rate adaptation based on the codec modes comprised in the determined codec mode subset having a bit rate below or equal to a bit rate associated with the indicated codec mode.

2. The method according to claim 1, further comprising:
    receiving a new indication of a codec mode;
    determining a codec mode subset based on the new indicated codec mode; and
    applying rate adaptation within the determined codec mode subset.

3. The method according to claim 1, further comprising receiving a second indication of a maximum bit rate indicating a changed maximum allowed bit rate and applying rate adaptation within the determined codec mode subset.

4. The method according to claim 1, wherein codec modes with constant and variable bit rate operation capabilities are associated with different codec mode subsets.

5. A method for handling codec rate adaptation in a communication network applying circuit switched communication, wherein the method is performed by a network node, the method comprising:
    operating processing circuitry of the network node to perform operations comprising:
    determining a codec mode subset, out of a number of codec mode subsets, which is currently supported by nodes involved in a service,
        wherein codec modes with a first property are associated with a first codec mode subset and codec modes with a second property are associated with a second codec mode subset, and the first property corresponds to Enhanced Voice Services (EVS) primary modes and the second property corresponds to EVS Adaptive Multi-Rate Wideband (AMR-WB) interoperability (IO) modes, and wherein codec modes with different bandwidth capabilities are associated with different codec mode subsets, wherein the EVS primary modes and the EVS AMR-WB IO modes and within the EVS standard;
    determining a maximum allowed bit rate for the service; and
    indicating a codec mode in the determined codec mode subset, associated with a bit rate which is less than or equal to the determined maximum bit rate, wherein the indication of the codec mode is configured to indicate at least the determined maximum bit rate for the codec mode.

6. The method according to claim 5, further comprising:
    determining that a new codec mode subset is to be applied, or that a new maximum bit rate within the currently applied subset is to be applied; and
    indicating a new codec mode.

7. A wireless device comprising processing circuitry, the processing circuitry being configured to cause the wireless device to:
receive an indication of a codec mode, wherein the indication of the codec mode is configured to indicate at least a maximum bit rate for a codec mode;
determine a codec mode subset based on the indicated codec mode
wherein codec modes with a first property are associated with a first codec mode subset and codec modes with a second property are associated with a second codec mode subset, and the first property corresponds to Enhanced Voice Services (EVS) primary modes and the second property corresponds to EVS Adaptive Multi-Rate Wideband (AMR-WB) interoperability (IO) modes, and wherein codec modes with different bandwidth capabilities are associated with different codec mode subsets, wherein the EVS primary modes and the EVS AMR-WB IO modes and within the EVS standard; and
apply rate adaptation based on the codec modes comprised in the determined codec mode subset having a bit rate below or equal to a bit rate associated with the indicated codec mode.

8. The wireless device according to claim 7, wherein the processing circuitry is further configured to cause the wireless device to perform the following:
receive a new indication of a codec mode;
determine a codec mode subset based on the new indicated codec mode; and
apply rate adaptation within the determined codec mode subset.

9. The wireless device according to claim 7, wherein the wireless device is one of: a user equipment, a mobile terminal, a stationary or mobile wireless device for machine-to-machine communication, an integrated or embedded wireless card, an externally plugged in wireless card and a dongle.

10. A network node for supporting rate adaptation, the network node comprising a processing circuitry, the processing circuitry being configured to cause the network node to:
determine a codec mode subset, out of a number of codec mode subsets, which is currently supported by nodes involved in a service,
wherein codec modes with a first property are associated with a first codec mode subset and codec modes with a second property are associated with a second codec mode subset, and the first property corresponds to Enhanced Voice Services (EVS) primary modes and the second property corresponds to EVS Adaptive Multi-Rate Wideband (AMR-WB) interoperability (IO) modes, and wherein codec modes with different bandwidth capabilities are associated with different codec mode subsets, wherein the EVS primary modes and the EVS AMR-WB IO modes and within the EVS standard;
determine a maximum allowed bit rate for the service; and
indicate a codec mode in the determined codec mode subset, associated with a bit rate which is less than or equal to the determined maximum bit rate, wherein the indication of the codec mode is configured to indicate at least the determined maximum bit rate for the codec mode.

11. The network node according to claim 10, wherein the processing circuitry is further configured to cause the network node to:
determine that a new codec mode subset is to be applied, or that a new maximum bit rate within the currently applied subset is to be applied; and
indicate a new codec mode.

12. The network node according to claim 10, wherein the network node is one of: a radio network controller (RNC), mobile switching center (MSC) and media gateway (MGW).

13. A computer program product comprising a non-transitory computer readable medium storing instructions that are executed processing circuitry of a wireless device to perform operations for supporting rate adaptation, the operations comprising:
receiving an indication of a codec mode, wherein the indication of the codec mode is configured to indicate at least a maximum bit rate for a codec mode;
determining a codec mode subset based on the indicated codec mode,
wherein codec modes with a first property are associated with a first codec mode subset and codec modes with a second property are associated with a second codec mode subset, and the first property corresponds to Enhanced Voice Services (EVS) primary modes and the second property corresponds to EVS Adaptive Multi-Rate Wideband (AMR-WB) interoperability (IO) modes, and wherein codec modes with different bandwidth capabilities are associated with different codec mode subsets, wherein the EVS primary modes and the EVS AMR-WB IO modes and within the EVS standard; and
performing rate adaptation based on the codec modes comprised in the determined codec mode subset having a bit rate below or equal to a bit rate associated with the indicated codec mode.

14. A computer program product comprising a non-transitory computer readable medium storing instructions that are executed by processing circuitry of a network node to perform operations for supporting rate adaptation, the operations comprising:
determining a codec mode subset, out of a number of codec mode subsets, which is currently supported by nodes involved in a service,
wherein codec modes with a first property are associated with a first codec mode subset and codec modes with a second property are associated with a second codec mode subset, and the first property corresponds to Enhanced Voice Services (EVS) primary modes and the second property corresponds to EVS Adaptive Multi-Rate Wideband (AMR-WB) interoperability (IO) modes, and wherein codec modes with different bandwidth capabilities are associated with different codec mode subsets, wherein the EVS primary modes and the EVS AMR-WB IO modes and within the EVS standard;
determining a maximum allowed bit rate for the service; and
indicating a codec mode in the determined codec mode subset associated with a bit rate which is lower than or equal to the determined maximum bit rate, wherein the indication of the codec mode is configured to indicate at least the determined maximum bit rate for the codec mode.

* * * * *